United States Patent Office 3,136,786
Patented June 9, 1964

3,136,786
DIELS-ALDER ADDUCTS OF ACYCLIC POLYFLU-OROPERHALOKETONES AND 1,3-DIENES
John F. Harris, Jr., Wilmington, Del., assignor to E. I. du Pont de Nemours and Company, Wilmington, Del., a corporation of Delaware
No Drawing. Filed Nov. 15, 1961, Ser. No. 152,663
17 Claims. (Cl. 260—345.1)

This invention relates to, and has as particular objects provision of, novel α-fluoropolyhaloalkyl-substituted dihydro-2H-pyrans and a method of preparing the same.

Dihydro-2H-pyrans are cyclic ethers having the six-membered heterocyclic structure shown in the formula of the parent compound named 5,6-dihydro-2H-pyran,

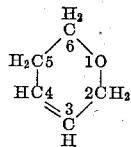

It has now been discovered that useful new fluorine-substituted dihydro-2H-pyrans can be obtained readily by Diels-Alder reaction of 1,3-dienes with α-fluoropolyhaloalkyl ketones. The products of the invention are 6,6-di(α-fluoropolyhaloalkyl)-5,6-dihydro-2H-pyrans in which substituents on the 3 and 4 carbon atoms of the heterocyclic rings are alike or different and are hydrogen, halogen or alkyl.

The compounds have the formula

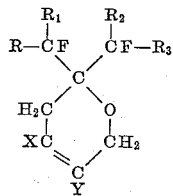

in which groups R and $R_2$ are halogen, groups $R_1$ and $R_3$ are hydrogen, halogen or polyfluorohaloalkyl and groups X and Y are hydrogen, halogen or alkyl.

The method of preparing these compounds is illustrated by the equation:

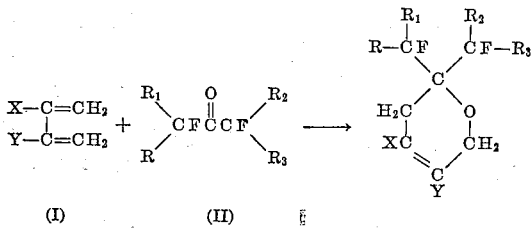

This equation shows a Diels-Alder reaction in which reactant (I) is the 1,3-diene, reactant (II) is the dienophile, and the groups R, $R_1$, $R_2$, $R_3$, X and Y are as defined above.

In the compounds of the preceding formula, R and $R_2$ are preferably fluorine or chlorine; and $R_1$ and $R_3$ are preferably fluorine, chlorine or lower polyfluorohaloalkyl radicals, especially perfluoroalkyl, ω-chloroperfluoroalkyl or ω-hydroperfluoroalkyl radicals of 1 to 8 carbon atoms. Groups X and Y are preferably hydrogen, fluorine, chlorine or lower alkyl of 1 to 8 carbon atoms.

The Diels-Alder reaction of the above equation is accomplished by bringing the reactants together under the influence of chemically activating energy, generally heat. The reaction temperature is generally in the range of 0 to 300° C., the particular level varying according to the particular reactants and other reaction variables. A reaction temperature in the range of about 25° to 250° C. is preferred. Ultraviolet irradiation also has a favorable activating influence, particularly in the lower part of the effective temperature range. A solvent is not necessary but can be used if desired. The reaction pressure is not critical and can be in the range of less than to greater than atmospheric pressure. For convenience, the autogenous pressure of the reactants in a closed vessel is generally used. The reaction vessel can be of metal, glass, or quartz, constructed to suit the conditions of operation employed.

The compounds of the invention are generally liquids or solids, depending upon the number of carbon atoms and the degree of symmetry of the specific compound. They can be isolated and purified by ordinary methods such as fractional distillation or crystallization.

The invention is illustrated in greater detail in the following nonlimiting examples in which parts are by weight.

EXAMPLE I

A mixture of 20 parts of 1,3-butadiene and 125 parts of α,α'-dichlorotetrafluoroacetone in a cylindrical quartz reactor, approximately 4 diameters long, maintained at atmospheric pressure and under reflux (the temperature of the mixture was room temperature or slightly below) from a condenser cooled with a solid carbon dioxide-acetone mixture, was exposed for a period of 8 days to the ultraviolet light emanating from a low-pressure, quartz, mercury "resonance" lamp fitted in a spiral around the reactor. Fractional distillation of the reaction mixture at atmospheric pressure yielded 102 parts of unchanged α,α'-dichlorotetrafluoroacetone and a residue, which was distilled under reduced pressure. There was obtained 7.9 parts of a colorless product boiling at 80–84° C. at 24–25 mm.; $n_D^{25}$ 1.4262. The product was identified by infrared and elemental analyses as the 1:1 Diels-Alder adduct, 6,6-bis(chlorodifluoromethyl)-5,6-dihydro-2H-pyran.

*Analysis.*—Calc'd for $C_7H_6Cl_2F_4O$: C, 33.2; H, 2.4; F, 30.0. Found: C, 34.2; H, 2.9; F, 30.2.

EXAMPLE II

A mixture of 14 parts of 1,3-butadiene and 50 parts of α,α'-dichlorotetrafluoroacetone was heated in a stainless steel pressure vessel for 8 hours at 200° C. The recovered, crude product was distilled to give 55.2 parts (87.5%) of 6,6-bis(chlorodifluoromethyl)-5,6-dihydro-2H-pyran, B.P. 79–79.5° C. at 21 mm., $n_D^{25}$ 1.4271.

*Analysis.*—Calc'd for $C_7H_6Cl_2F_4O$: C, 33.2; H, 2.4; F, 30.0. Found: C, 33.8; H, 2.6; F, 29.3.

EXAMPLE III

A mixture of 4.1 parts of 2,3-dimethyl-1,3-butadiene and 9.2 parts of 90% hexafluoroacetone was sealed in a heavy-walled glass tube and heated for 8 hours at 200° C. The tube was cooled and opened. The liquid product was distilled to give 10.8 parts (92%) of 6,6-bis(trifluoromethyl)-5,6-dihydro-3,4-dimethyl-2H-pyran, B.P. 92–93° C. at 110 mm., $n_D^{25}$ 1.3755.

*Analysis.*—Calc'd for $C_9H_{10}F_6O$: C, 43.5; H, 4.1; F, 45.9. Found: C, 43.8; H, 4.3; F, 46.3, 46.2.

EXAMPLE IV

A mixture of 10 parts of α,α'-dichlorotetrafluoroacetone and 4.1 parts of 2,3-dimethyl-1,3-butadiene was sealed in a heavy-walled glass tube and heated for 10 hours at 200° C. The tube was chilled and opened, and the liquid was distilled to give 10.6 parts (76%) of 6,6-bis(chlorodifluoromethyl) - 5,6-dihydro-3,4-dimethyl-2H-pyran, B.P. 101–102° C. at 22 mm., $n_D^{25}$ 1.4362.

*Analysis.*—Calc'd for $C_9H_{10}F_4Cl_2O$: C, 38.45; H, 3.6; F, 27.0. Found: C, 38.8; H, 3.9; F, 27.0.

EXAMPLE V

A mixture of 8 parts of decafluoro-3-pentanone and 2.5 parts of 2,3-dimethyl-1,3-butadiene was sealed in a heavy-walled glass tube and heated at 200° C. for 10 hours. The recovered liquid was distilled to give 10 parts (95%) of 6,6-bis(pentafluoroethyl)-5,6-dihydro-3,4-dimethyl-2H-pyran, B.P. 71–72° C. at 19 mm. A sample was redistilled, B.P. 58° C. at 10 mm., $n_D^{25}$ 1.3622.

*Analysis.*—Calc'd for $C_{11}H_{10}F_{10}O$: C, 37.9; H, 2.9; F, 54.6. Found: C, 38.3; H, 3.0; F, 54.9.

EXAMPLE VI

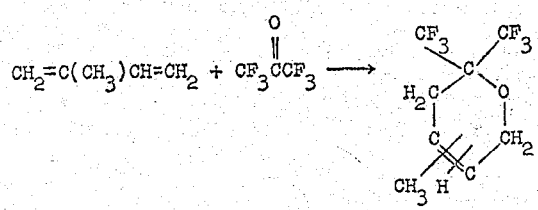

Into a heavy glass-walled tube there was sealed 8.8 parts of isoprene and 26.4 parts of 85% hexafluoroacetone. The tube was then heated in a steam bath (ca. 100° C.) for 16 hours. After the tube had been cooled, it was opened and the contents distilled to give 25.3 parts (83%) of colorless liquid, B.P. 133–140° C. Most of the sample boiled at 137° C. The position of the methyl group has not been rigorously established, but it is believed that it is located at position 4 and the product therefore is 6,6-bis(trifluoromethyl)-5,6-dihydro-4-methyl-2H-pyran.

*Analysis.*—Calc'd for $C_8H_8F_6O$: C, 41.0; H, 3.4; F, 48.7. Found: C, 41.1; H, 3.4; F, 48.5.

Additional examples of the new dihydro-2H-pyrans that can be prepared by the process illustrated in Examples I to VI are shown in the following table, in which the columns headed R, $R_1$, $R_2$ and $R_3$ contain representative substituents of the α-fluoropolyhaloalkyl ketone and the columns headed X and Y contain representative substituents of the 1,3-diene in the Diels-Alder reaction previously presented.

*Table I*

| R | $R_1$ | $R_2$ | $R_3$ | X | Y |
|---|---|---|---|---|---|
| Cl | Cl | Cl | Cl | $C_2H_5$ | H |
| F | $C_3F_7$ | F | $C_3F_7$ | Cl | H |
| F | H | F | H | Cl | Cl |
| F | F | F | F | $C_4H_9$ | $C_4H_9$ |
| F | Cl | F | Cl | Br | H |
| F | $C_7F_{15}$ | F | $C_7F_{15}$ | F | H |
| F | Br | F | Br | $C_2H_5$ | $C_2H_5$ |
| Br | F | Br | F | $C_3H_7$ | H |
| F | $C_4F_9$ | F | $C_4F_9$ | H | H |
| F | $Cl(CF_2)_3$ | F | $Cl(CF_2)_3$ | $CH_3$ | $CH_3$ |
| F | $Cl(CF_2)_5$ | F | $Cl(CF_2)_5$ | H | H |
| F | $H(CF_2)_2$ | F | $H(CF_2)_2$ | $CH_3$ | H |
| F | $H(CF_2)_6$ | F | $H(CF_2)_6$ | H | H |

Dihydro-2H-pyrans obtained from α-fluoropolyhaloalkyl ketones and 1,3-dienes are very effective solvents for a variety of applications. For example, 6,6-bis(chlorodifluoromethyl)-5,6-dihydro-2H-pyran and 6,6-bis(trifluoromethyl) - 5,6 - dihydro-4-methyl-2H-pyran (i.e., the products of Examples I and VI, respectively) are solvents for polyvinyl acetate. Viscous solutions prepared by slightly warming polyvinyl acetate in these solvents were flowed onto glass plates, and after air drying overnight coherent polyvinyl acetate films could be stripped from the plates. These same dihydro-2H-pyrans are also solvents for low melting tetrafluoroethylene polymers, and the resulting solutions are useful for waterproofing paper. Strips of water-wettable paper were dipped in such solutions and subsequently dried, and the treated strips repelled water effectively. The products can also be used as degreasing solvents. For example, coatings of waterproofing grease on steel panels were effectively removed by washing the coated panels with the dihydro-2H-pyrans of Examples I and VI, respectively.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises reacting together, at a temperature of about 0–300° C. and under the influence of chemically activating energy, (I) an otherwise non-substituted 1,3-diene having at each of the 2- and 3-positions a member of the group consisting of hydrogen, fluorine, chlorine and alkyl of up to 8 carbons and (II) a dienophile of the formula

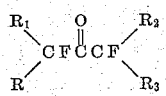

wherein R and $R_2$ are halogen and $R_1$ and $R_3$ are selected from the group consisting of hydrogen, halogen and polyfluorohaloalkyl of up to 8 carbons.

2. The process of claim 1 wherein heat alone is employed as chemically activating energy.

3. The process of claim 1 accomplished at a temperature of about 25–250° C.

4. The process of claim 1 wherein ultraviolet light is employed as chemically activating energy.

5. The process which comprises reacting together, at a temperature of about 0–300° C. and under the influence of chemically activating energy, 1,3-butadiene and α,α'-dichlorotetrafluoroacetone.

6. The process of claim 5 employing ultraviolet light.

7. The process of claim 5 employing a temperature of about 25–250° C.

8. The process which comprises reacting together 2,3-dimethyl-1,3-butadiene and hexafluoroacetone at a temperature of about 25–250° C.

9. The process which comprises reacting together 2,3-dimethyl - 1,3-butadiene and α,α'-dichlorotetrafluoroacetone at a temperature of about 25–250° C.

10. The process which comprises reacting together 2,3-dimethyl-1,3-butadiene and decafluoro-3-pentanone at a temperature of about 25–250° C.

11. The process which comprises reacting together isoprene and hexafluoroacetone at a temperature of about 25–250° C.

12. A fluorine-substituted dihydro-2H-pyran of the formula

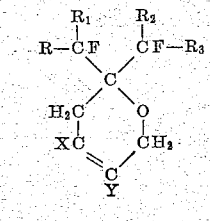

wherein R and $R_2$ are halogen; $R_1$ and $R_3$ are selected from the group consisting of hydrogen, halogen and polyfluorohaloalkyl of up to 8 carbons and X and Y are selected from the group consisting of hydrogen, halogen and alkyl of up to 8 carbons.

13. 6,6 - bis(chlorodifluoromethyl) - 5,6 - dihydro-2H-pyran.

14. 6,6 - bis(trifluoromethyl)-5,6-dihydro-3,4-dimethyl-2H-pyran.

15. 6,6 - bis(chlorodifluoromethyl)-5,6-dihydro-3,4-dimethyl-2H-pyran.

16. 6,6-bis(pentafluoroethyl)-5,6-dihydro-3,4-dimethyl-2H-pyran.

17. 6,6 - bis(trifluoromethyl) - 5,6-dihydro-methyl-2H-pyran of the formula

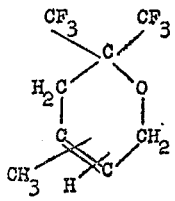

References Cited in the file of this patent
UNITED STATES PATENTS
3,014,045    Marcus et al. _____ Dec. 19, 1961